United States Patent [19]

Horak et al.

[11] 4,218,713
[45] Aug. 19, 1980

[54] APPARATUS FOR CORRECTING TIME BASE ERROR IN A MULTICHANNEL, SAMPLED-ANALOG VIDEO SIGNAL

[75] Inventors: Jerry R. Horak; Peter L. P. Dillon, both of Rochester; Ronald R. Firth, Fairport, all of N.Y.

[73] Assignee: Eastman Kodak Company, Rochester, N.Y.

[21] Appl. No.: 957,268

[22] Filed: Nov. 3, 1978

[51] Int. Cl.$^2$ .............................................. H04N 5/79
[52] U.S. Cl. ........................................ 360/36; 360/73; 360/22; 360/26; 358/8
[58] Field of Search ..................... 360/73, 36, 26, 27, 360/22, 23, 9; 358/8

[56] References Cited

U.S. PATENT DOCUMENTS

| | | | |
|---|---|---|---|
| Re. 25,809 | 6/1965 | Johnson | 360/26 |
| 3,327,299 | 6/1967 | Johnson | 360/26 |
| 3,959,815 | 5/1976 | Potter | 360/36 |
| 3,975,764 | 8/1976 | Koboyoshi | 360/23 |
| 4,131,919 | 12/1978 | Lloyd | 360/9 |

Primary Examiner—Stuart N. Hecker
Assistant Examiner—Alan Faber
Attorney, Agent, or Firm—Thomas H. Close

[57] ABSTRACT

Apparatus for correcting time base error (such as flutter, scatter, and skew) in a multichannel, sampled-analog type video signal includes means for clocking the signal portions carried by respective channels into respective deflutter buffers by respective input clock signals derived from horizontal sync information appearing in respective channels. Each buffer contains input register means capable of receiving a signal portion containing flutter distortion, storage means for holding the signal portion received, and output register means for delivering the signal at a substantially constant periodic rate. The input register means is controlled by the input clock signal, which contains flutter distortion corresponding to the flutter distortion in the signal portion. By synchronously delivering the signal portions from the output register means in all of the buffers, under control of a common output clock signal, flutter is removed from the signal portion in each channel, and inherently, scatter and skew among the signal portions in respective channels are removed from the signal.

10 Claims, 13 Drawing Figures

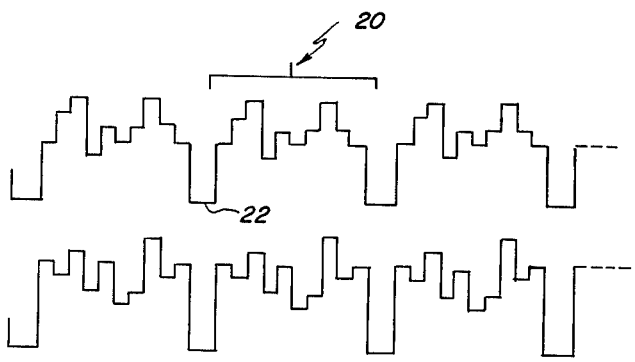
FIG. 3a CH.1
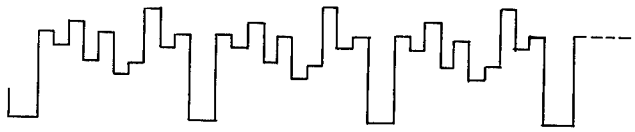
FIG. 3b CH.2
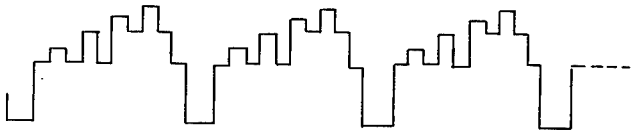
FIG. 3c CH.3
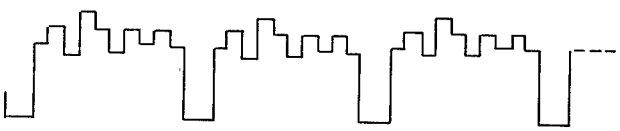
FIG. 3d CH.4
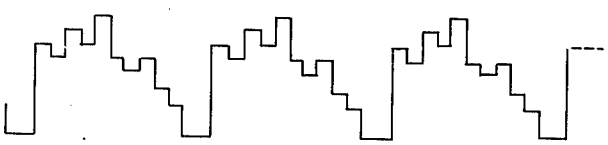
FIG. 3e CH.5

APPARATUS FOR CORRECTING TIME BASE ERROR IN A MULTICHANNEL, SAMPLED-ANALOG VIDEO SIGNAL

BACKGROUND OF THE INVENTION

This invention relates to the reproduction of video recordings, and more particularly to improvements in video tape players of the type which employs a multichannel, essentially-fixed, magnetic head to reproduce a sampled-analog video signal recorded in a plurality of parallel tracks on a video tape. The term "essentially-fixed" as used herein with respect to magnetic heads is intended to distinguish linear recording apparatus from helical-scan and similar type apparatus wherein the recording head(s) moves with respect to the apparatus during recording or playback.

An example of an essentially-fixed head video recording apparatus for recording a sampled-analog video signal on a plurality of tracks, and the advantages of such apparatus over the prior art, are disclosed in copending U.S. patent application Ser. No. 957,269 entitled MULTICHANNEL RECORDING FORMAT FOR A SAMPLED-ANALOG COLOR VIDEO SIGNAL by J. R. Horak et al and filed on the same day as the present application.

The above-referenced copending application discloses a video camera/recorder having a multichannel sampled-analog recording format wherein a color video signal representing successive groups of analog color samples, generated, for example, by a solid state image sensing array(s), is assigned, in a novel manner, to a plurality of channels. The signal is separated, sample-by-sample, and such samples are assigned to respective channels of a plurality of channels such that the respective channels contain subgroups of samples representing only one color per subgroup. The signal in the channels is recorded on a magnetic tape in a plurality of parallel tracks, one track per channel, by an essentially-fixed, multichannel recording head.

When such a signal is being reproduced from the recording, an essentially-fixed multichannel playback head reproduces the signal portion appearing in each track and applies such signal portion to a corresponding channel. Signal processing apparatus similar to that employed to separate the signal on a sample-by-sample basis is used to recombine the samples from the respective channels to produce an output signal which may have the same form as the original signal. Ideally, to effectively produce the output signal, the tape is moved past the playback head at the same speed and with the same relative orientation between the head and the tape that were employed during recording; in addition, the relative alignment among the gaps in the playback head must match exactly that of the recording head.

In reality, the above ideal conditions are difficult to achieve, and as a result, several forms of time base error distortion may be present in the reproduced signal. Such distortion may result in a severely degraded or totally incomprehensible video display.

One form of time base error—called flutter—results from variations in the speed of the tape moving past the record or playback head. These variations may be caused by localized tape stretch, tape vibration, and/or fluctuations in the speed of the tape transport mechanism. Flutter in the reproduced video signal causes time-base instability in the synchronizing information within the signal, which may degrade the quality of the video display.

A special case of flutter—called drift—may result from an overall tape stretch, and/or a slight mismatch between the tape transport speeds during recording and playback. Although drift, which may be thought of as zero-frequency, high-amplitude flutter, may not adversely affect the display of the reproduced video signal, it must be taken into account when recombining the signal portions carried by respective channels during reproduction of the original signal.

Another form of time base error that may prohibit effective recombination of the signal portions recorded in respective channels is called skew. Skew results from angular misalignment between the tape and the playback head caused by mechanical misalignment of the head in the apparatus and/or by an angular displacement of the tape during transport past the head. The tape may, in effect, squirm past the head during recording or playback, thereby introducing varying amounts of skew in the signals recorded thereon. Skew causes the signal portions in respective channels to be out of synchronization relative to each other and therefore interferes with effective recombination of the signal portions to reproduce the original video signal.

A third form of time base error, called scatter, results from variation in the relative positions of the gaps of the record head with respect to the relative positions of the corresponding gaps in the playback head. The effects of scatter on the effective recombination of the signal portions recorded in the multiple channels are similar to those of skew.

Thus, it is desirable to provide means for removing signal distortions such as flutter, scatter, and skew from the video signal reproduced by an essentially-fixed head from a multitrack video recording.

One prior art system for removing skew from a multichannel video signal employs a voltage variable analog delay line in each channel. See U.S. Pat. No. 3,327,299 issued June 20, 1967 to W. R. Johnson. Periodic reference signals such as sync pulses recorded in each channel are employed as feedback signals to develop control signals for the delay lines. Although skew is thus removed between signal portions in the various channels, time base instability of the overall signal resulting from flutter is not.

Another system employing analog delay lines, see U.S. Pat. No. Re. 25,809 issued June 22, 1965 to W. R. Johnson, addresses the problem of removing flutter and skew from a multichannel video signal. One problem with prior art devices employing voltage variable analog delay lines lies with the delay lines themselves. Such delay lines tend to delay different frequencies by different amounts, thereby introducing phase distortion into the delayed signal.

Some recently developed circuits for correcting the time base of single channel video signals employ charge transfer type analog shift registers as delay elements. One such circuit, employing a bucket brigade type device as an analog delay line, is shown in U.S. Pat. No. 3,959,815 issued May 25, 1976 to Rotter et al. A video signal, to be defluttered, is passed through the bucket brigade device. Upon exiting the device, the horizontal sync pulses are stripped from the video signal and employed as a feedback signal in a phase-locked-loop clock generator which is also supplied with a fixed frequency reference signal. The clock signal thus generated controls the operation of the bucket brigade to either slow down or speed up the transition of the video signal through the bucket brigade device. Such an approach, although possibly adequate for removing relatively low amplitude high frequency flutter from a single channel video signal, is severely limited when the signal is a multichannel, sampled analog video signal exhibiting combined flutter, scatter and skew that may approach channel-to-channel time base differences of one line scan, i.e. approximately 60 microseconds. A bucket brigade device employing feedback control capable of providing compensation for delays of such magnitude, while preserving the information content of the sampled analog video signal, would have to provide a very long delay indeed, requiring a prohibitively large number of elements.

SUMMARY OF THE INVENTION

According to the present invention, signal distortions such as flutter, scatter and skew are removed from a multichannel sampled-analog video signal (reproduced from a plurality of tracks) by means of apparatus that includes an output clock signal generator for producing a substantially constant frequency output clock signal. A plurality of input clock signal generators, responsive to horizontal sync information in the respective channels produce a corresponding plurality of input clock signals, one input clock signal per channel. Respective input clock signals possess flutter corresponding to the flutter present in the respective horizontal sync information. Each of a plurality of deflutter buffers, one buffer per channel, includes: (a) an input shift register for receiving the signal portion, appearing in the associated channel, under control of the associated input clock signal, (b) means for storing the signal portion for a period of time, and (c) an output shift register for delivering the signal portion, appearing in the channel, under control of the substantially constant frequency output clock signal.

In the two alternative embodiments described, the tape transport is controlled by a phase-locked servo. In a preferred embodiment of the invention, relatively low frequency flutter and drift (0 to ~200 Hz) are removed from the signal by the tape drive servo. The feedback signal for the servo is generated from one channel of the multichannel signal by extracting the horizontal sync information therefrom and generating a feedback signal for the motor control servo which is phase-locked to a reference frequency, generated by a local reference oscillator preferably similar to a television horizontal sync generator. The substantially constant frequency output clock signal for clocking the respective signal portions out of the deflutter buffers is likewise developed from the local reference oscillator. Processing and timing signals used in further processing the signal are similarly developed from the local reference oscillator to maintain phase stability in the output video signal.

In an alternative embodiment, relatively low frequency flutter and drift (0 to ~10 Hz) are allowed to be present in the output signal, the phase-locked-loop of a standard television receiver being capable of locking to such a fluttering or drifting signal. The feedback signal for the motor control servo is generated by a tachometer connected to a capstan drive motor. The substantially constant frequency output clock for clocking the respective signal portions out of the deflutter buffers is developed from one channel by extracting the horizontal sync information therefrom and generating the substantially constant frequency output clock signal in a slowly responding phase-locked-loop frequency multiplier. Processing and timing signals used in further processing of the video signal are similarly developed from the output clock signal to maintain phase stability in the output video signal.

BRIEF DESCRIPTION OF THE DRAWINGS

The invention will be described in detail with reference to the drawings, wherein:

FIGS. 3a–e are waveform diagrams, similar to FIGS. 1a–e, illustrating the signal portions produced by the circuit shown in FIG. 2;

DESCRIPTION OF THE PREFERRED EMBODIMENT

FIGS. 1a–e illustrate a multichannel sampled-analog video signal of the type produced by the camera/recorder disclosed in U.S. patent application No. 957,269 entitled MULTICHANNEL RECORDING FORMAT FOR A SAMPLED-ANALOG COLOR VIDEO SIGNAL by J. R. Horak et al filed on the same day as the present application. The signal (reproduced from eight tracks on a magnetic tape) is carried by eight channels (only five channels being shown for the sake of illustration). Each channel carries subgroups 20 of analog samples periodically interspersed with blanking pulses 22. Horizontal sync information is represented, in this teaching, by the leading edges of the blanking pulses. In a preferred embodiment, each subgroup in each channel comprises 40 samples. Eight corresponding subgroups in the eight channels (or 320 samples) represent one scan line of a video frame or field. FIGS. 1a–e illustrate flutter which causes the widths of the samples and hence the spacings between blanking pulses to vary. The variations in the widths of the samples shown between the respective groups of samples in each channel have been exaggerated in FIGS. 1a–e for purposes of illustration.

The groups of samples in the first three channels (FIGS. 1a–c) are also shown "skewed" from channel-to-channel along a skew axis A, and the group of samples in channels 4 and 5 (FIGS. 1d–e) are shown "scattered" from channel-to-channel with respect to the skew axis A. In the reproduced signal, the amount of skew may be a constantly changing quantity as a result of the tape "squirming" past the head. Such changing amounts of skew also result in changing amounts of flutter from channel-to-channel.

As stated earlier, the function of the present invention is to remove flutter from the signal portions in the channels and to eliminate scatter and skew from among the signal portions in respective channels. Corresponding subgroups of samples in respective channels are thereby synchronized so that the signal portions may be effectively recombined. The reproduced video signal will have a relatively stable time base as required by a conventional television receiver.

Figure 1:
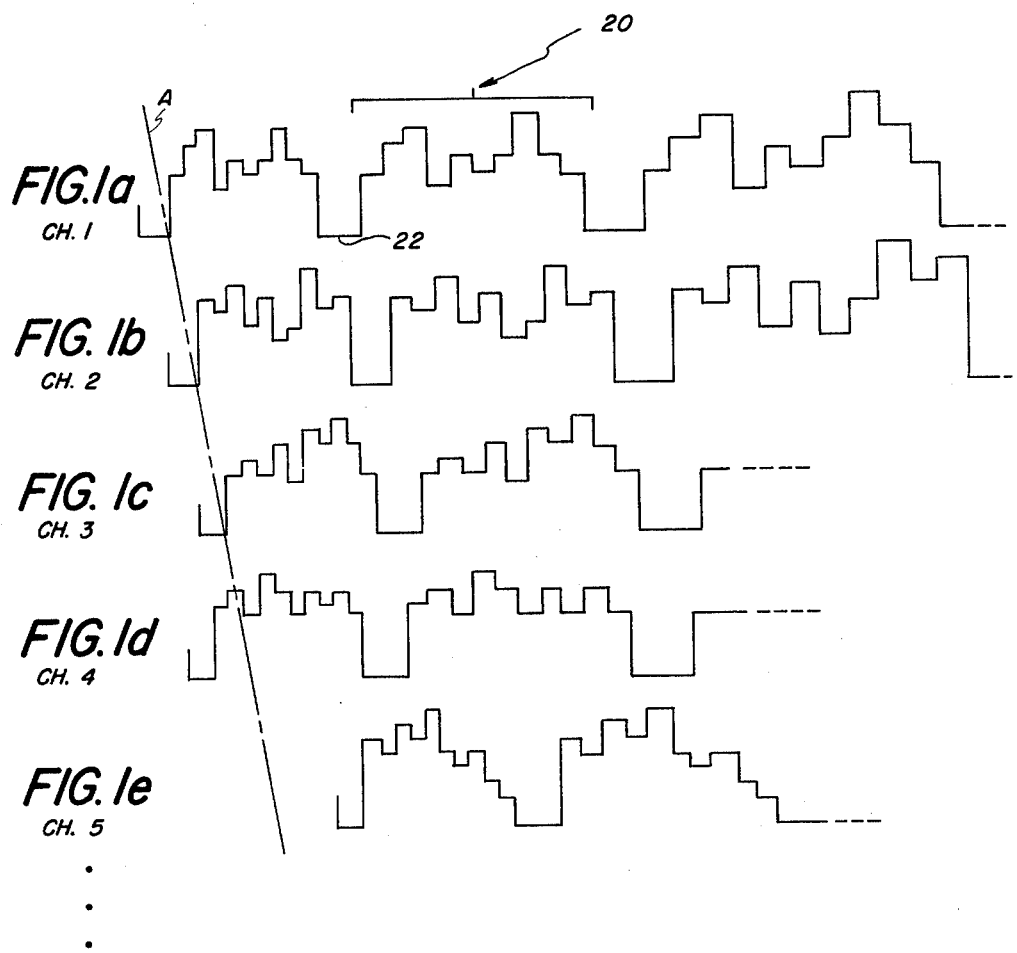
FIGS. 1a–e are waveform diagrams illustrating flutter in, and scatter and skew among, signal portions in respective channels of a multichannel sampled-analog video signal.
Figure 2:
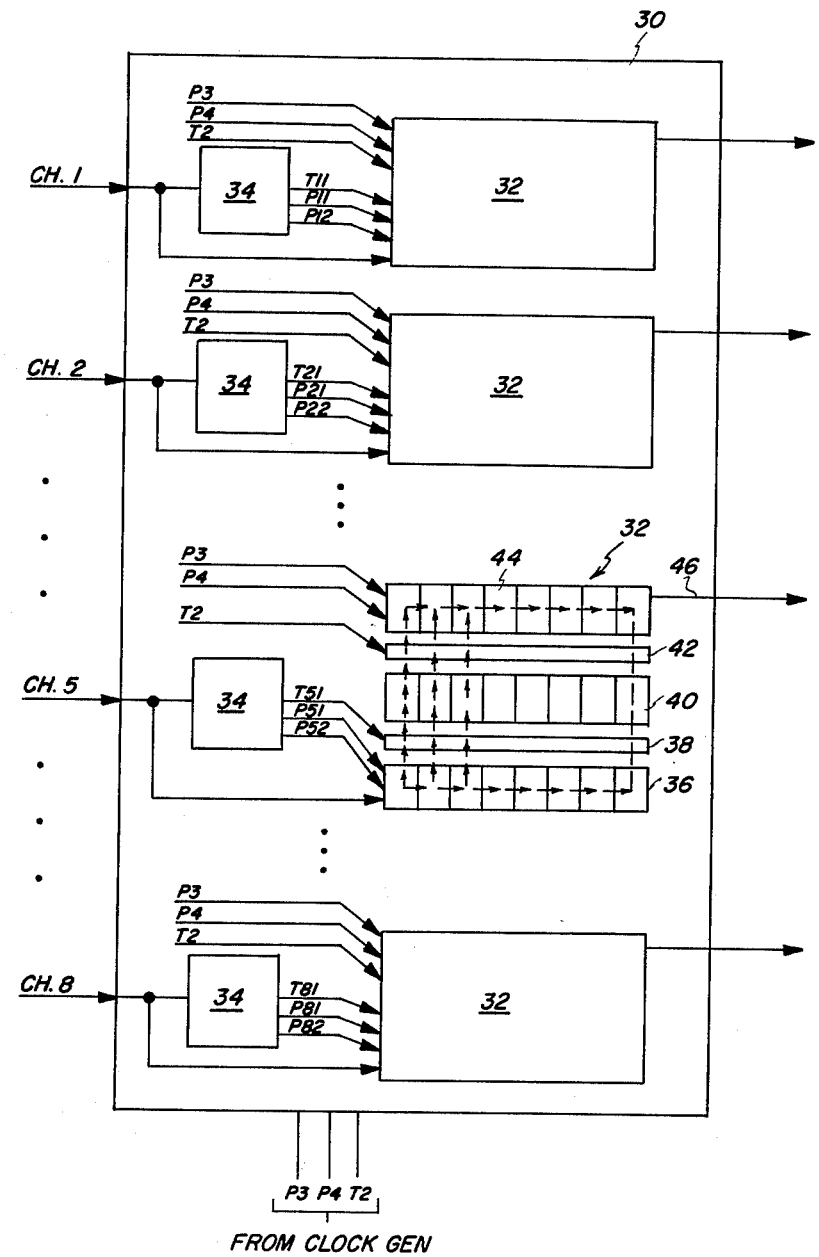
FIG. 2 is a schematic diagram showing a time base correcting circuit according to the present invention.

To achieve the above-identified function, a time base correcting circuit as shown in FIG. 2 is provided. The time base correcting circuit 30 is comprised of eight substantially identical charge transfer type analog deflutter buffers 32, of which those for channels 1, 2, 5 and 8 are shown for example. Each buffer 32 includes: input register means of the charge transfer variety capable of receiving, under control of an input clock signal, a signal portion comprised of discrete analog samples; a means for storing the signal portion for a period of time; and an output register of the charge transfer variety for processing the signal portion under control of an output clock signal. An example of such a deflutter buffer is shown in detail in channel 5 of FIG. 2. Such a deflutter buffer is capable of applying a time base correction of say $\pm\frac{1}{2}$ horizontal line period (i.e. approximately 60 microseconds to a signal portion, while retaining the integrity of the respective analog samples in the signal portion.

The configuration taught by Hayward (as shown in more detail in channel 5) will be described. The deflutter buffer is provided with a sync detect circuit and phase-locked-loop clock generator circuit 34.

Circuit 34 detects the leading edges of the blanking pulses in the signal portion carried by the channel to provide sync signals. The sync signals are applied to and frequency-multiplied in a phase-locked-loop clock generator, contained in circuit 34, to produce a two-phase clock signal $P_{n1}$, $P_{n2}$ (where n is the channel number) which possesses flutter distortion corresponding to the flutter distortion present in the sync signals. As shown for channel 5 in FIG. 2, the signal portion in the channel is clocked into an analog shift register 36 under control of the two-phase clock signal $P_{51}$, $P_{52}$. Analog shift register 36 is a charge transfer device such as a two-phase charge coupled device (CCD) or a bucket brigade device (BBD). Since the two-phase clock signal $P_{51}$, $P_{52}$ possesses flutter distortion that matches the flutter distortion present in the signal portion, the analog samples in the signal portion may be effectively clocked into the shift register, sample-by-sample. After 40 samples, representing every eighth sample in one line of video information, have been clocked into the register 36, the clock generator portion of circuit 34 produces a transfer pulse $T_{51}$ that activates a transfer gate 38 to shift, in parallel, the samples stored in register 36 into a temporary storage register 40. The samples are stored in temporary storage register 40 for a period averaging the time of one-half a line scan, i.e. approximately 30 microseconds. The deflutter buffer 32 includes an output analog shift register 44 for delivering the defluttered signal portion. After a previously held group of analog samples has been clocked out of output register 44, a transfer signal $T_2$ is applied to a transfer gate 42 to shift a next group of samples, in parallel, from storage register 40 into output register 44. The transfer signal $T_2$ is applied simultaneously to all the deflutter buffers 30. The samples in output register 44 are then transferred in a serial manner onto an output line 46 by a substantially constant frequency two-phase clock signal $P_3$, $P_4$ that is applied to all the output registers of all the deflutter buffers. In this manner, flutter is removed from the signal portion in each channel. The signal portions appearing at the outputs of the distortion correcting circuit 30 will appear as shown in FIGS. 3a–e. It will be noted, that by removing flutter in each channel and by employing a common readout clock signal, scatter and skew among channels are inherently removed. Not only does the circuit remove relatively fixed amounts of scatter and skew, but it also removes changing amounts of skew. As was noted earlier, changing amounts of skew are accompanied by changing amounts of flutter which are also removed from the signal portions in the various channels.

Since each deflutter buffer 32 produces one group of samples approximately every 60 microseconds, succeeding groups of samples may reside in storage registers 40 for a period of time up to about 60 microseconds. Consequently, if the total cumulative time base error in the overall signal, plus the maximum displacement from one channel to another due to scatter or skew, never exceeds about $\pm 30$ microseconds, the time base correcting circuit 30 will adequately remove the error. Some forms of time base error, such as drift, after a period of time, may result in a time base error exceeding $\pm 30$ microseconds. In which case, additional steps must be taken to reduce the distortion prior to the application of signal portions to the deflutter buffers, or else the capacity of the buffers to accommodate the signal will be exceeded. For example, tape stretch over a significant length of the tape could easily cause the overall time base error to exceed $\pm 30$ microseconds. Similarly, if the tape drive were slightly slow, or fast, over a significant period of time, cumulative time base error could easily exceed $\pm 30$ microseconds. One straightforward solution to this problem would be to increase the amount of delay afforded by the deflutter buffers to accommodate some maximum time base error that might be expected in a video program. This solution, however, is quickly seen to be impractical since the amount of additional storage space would be considerable for even a relatively small rate of drift. Two alternative embodiments employing different solutions to the drift problem are provided for use with the present invention.

According to the preferred embodiment, flutter of relatively low frequency, and/or drift (0 to $\sim 200$ Hz), are removed by the tape drive system. Higher frequency flutter, and scatter and skew, are removed by the time base correcting circuit 30.

According to an alternative embodiment, the tape drive is driven at a constant rate and only relatively high frequency flutter ($>10$ Hz) and substantially all scatter and skew are removed by the distortion correcting circuit 30. The resulting signal may contain low frequency flutter, and/or drift, that can be effectively tracked by the sync acquisition circuitry in a standard television receiver.

Figure 4:
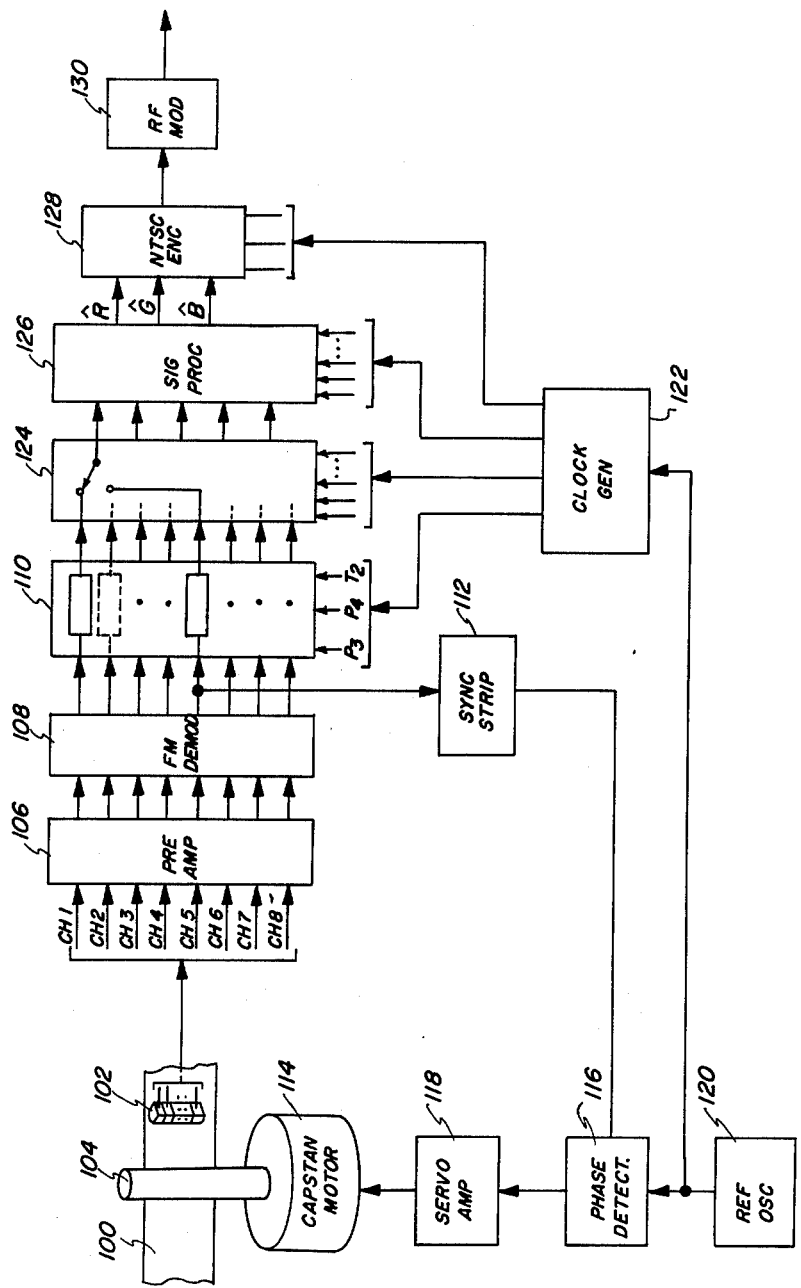
FIG. 4 is a schematic diagram showing a preferred embodiment of playback apparatus incorporating a time base correcting circuit according to the present invention; the playback apparatus removes both the high and low frequency flutter and drift from the output signal.

Apparatus according to the preferred embodiment discussed above is shown schematically in FIG. 4. Magnetic tape 100, upon which a sampled-analog type signal is recorded in a plurality of tracks, is moved past a multigap essentially-fixed playback head 102 by a capstan 104. Playback head 102 senses the signal portions recorded in the plural tracks and applies such signal portions to a corresponding plurality of channels (in this case, eight). The signal in the channels is first amplified by amplifier 106. If the signal portions were frequency modulated for recording, they are frequency demodulated in a bank of frequency demodulation circuits 108.

The demodulated signal portions are supplied to the time base correcting circuit similar to the circuit 30 shown at FIG. 2.

One of the channels, in this case channel 5, which is reproduced from a centrally located track on the tape, is tapped off between the frequency demodulator 108 and the time base correcting circuit 110 and its signal portion supplied to a sync strip circuit 112 that produces sync signals from the leading edges of the blanking pulses in channel five. The output of the sync strip circuit 112 is employed as a feedback signal to a phase-locked-loop servo drive to control a capstan motor 114. Included in the phase-locked-loop motor control are a phase detector 116 and a servo amplifier 118. The phase detector also receives a reference signal from a local reference oscillator 120 and generates an error signal representing the difference in phase between the reference signal and the feedback signal from circuit 113. Servo amplifier 118 receives the error signal and depending on the nature of the error signal, supplies more or less power to the capstan motor 114 to maintain the speed of the motor relatively constant.

Thus, low frequency flutter (0 to ~200 Hz) is removed from the sampled analog video signal by means of this servo system. Remaining flutter, scatter, and skew are removed by the time base correcting circuit 110 as described above. The substantially constant frequency two-phase output clock signal $P_3$, $P_4$ and the transfer signal $T_2$ are generated by a clock generator 122 in response to the reference signal supplied by the local reference oscillator 120. The clock generator, in response to the reference signal, likewise generates the timing and gating signals supplied to a sample combining circuit 124, a signal processing circuit 126, and an NTSC encoder 128, thereby maintaining phase stability in the final output video signal. The sample combining circuit receives the time base corrected signal portions from circuit 110 and under control of the gating signals from the clock generator, combines the samples carried by the channels to produce the signals required by the signal processing electronics. If the signal processing electronics comprises, for example, the circuit disclosed in U.S. Pat. No. 4,148,059, entitled "Signal Processing for Discrete-Sample-Type-Color-Video Signal", issued Apr. 3, 1979 to P. L. P. Dillon and B. E. Bayer, the signals produced by the sample combining circuit 110 will represent a "red" signal, a "blue" signal, a "slow" (i.e. low frequency) "green" signal, and a "fast" (i.e. high frequency) "green" signal. The signal processing electronics smooths the sampled analog signals by interpolating along rows or lines of video information and produces a luminance detail signal from a difference between the "slow" green signal and the "fast" green signal. The luminance detail signal is added to the "red" and "blue" signals to generate "red", "green" and "blue" signals (R, G and B) of the type that would be produced by a standard television camera. The "red", "green" and "blue" signals are supplied to the NTSC encoder 128 along with a 3.58 mHz color burst frequency and blanking and sync pulse trains developed by clock generator 122 from the reference frequency supplied by local reference oscillator 120.

The output of the NTSC encoder is a standard NTSC composite color video signal which may be displayed on a monitor or modulated onto an RF carrier in an RF modulator 130 for display on a standard television receiver.

Figure 5:
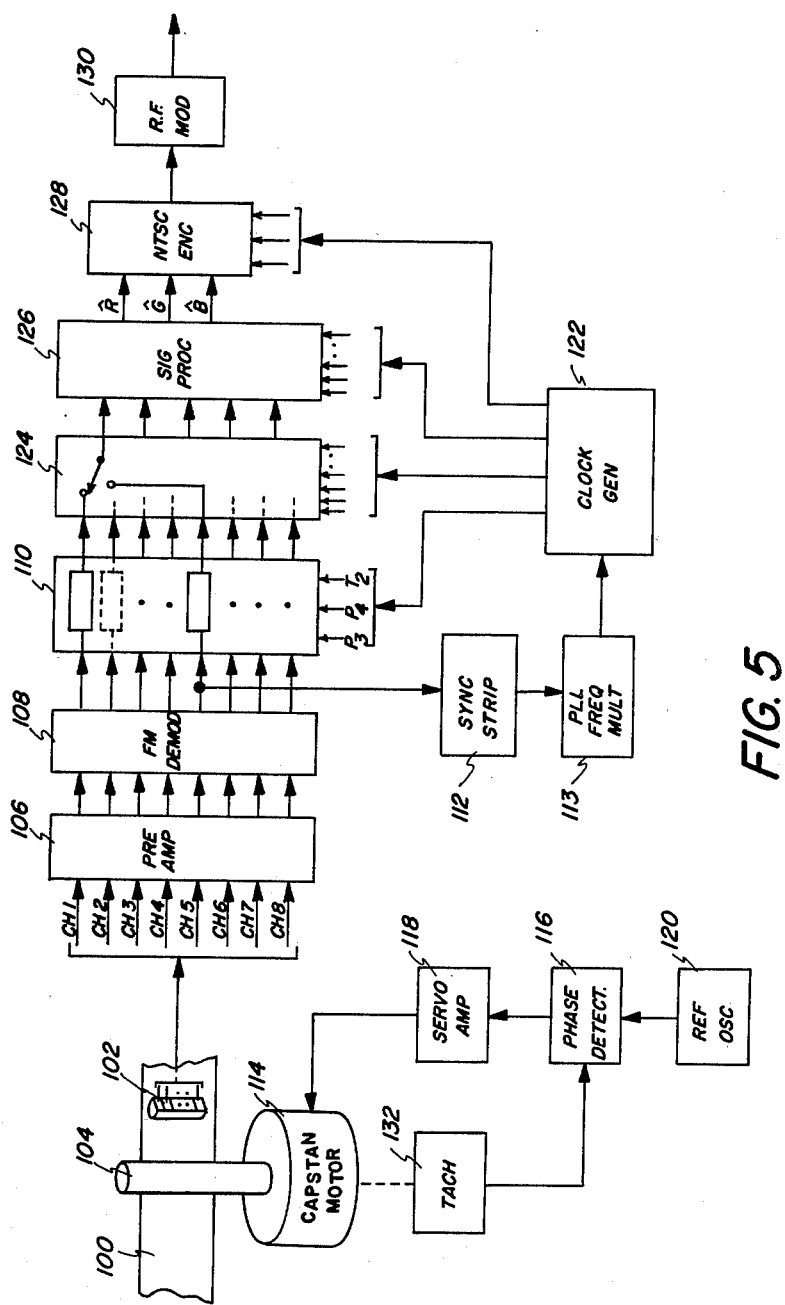
FIG. 5 is a schematic diagram showing an alternative embodiment of playback apparatus incorporating a time base correcting circuit according to the present invention; the playback apparatus removes high frequency flutter from the output signal, but low frequency flutter and/or drift are allowed to remain in the output signal.

According to the alternative embodiment, shown in FIG. 5, low frequency flutter and drift (0 to ~10 Hz) are allowed to remain in the output signal to be tracked by the sync acquisition circuitry in a standard television receiver. As shown in FIG. 5, wherein components similar to those of FIG. 4 have been similarly numbered, the capstan drive motor 114 is controlled by a phase-locked-loop comprising a tachometer 132 for providing a feedback signal, a reference oscillator 120 for supplying a reference frequency, a phase detector 116, and a servo amplifier 118. Differences in phase between the reference signal and the feedback signal result in an output, produced by the phase detector, that is supplied to a servo amplifier 118 to control the speed of the capstan motor 114, thereby driving the tape 100 at a constant rate. Tape strength, vibration, skew, or head gap scatter will result in drift, flutter, skew or scatter, respectively, in the signal produced by the multigap playback head 102. As in the previously described preferred embodiment, the video signal in the plurality of channels is amplified in amplifier 106. It may be frequency demodulated in a demodulator 108, and is supplied to the time base correcting circuit 110. One of the channels is tapped off and its signal portion is applied to a sync strip circuit 112 which detects the leading edge of the blanking pulses in that channel and generates a sync pulse train in response thereto. The sync pulse train is applied to a relatively slow responding phase-locked-loop frequency multiplier 113 to develop a substantially constant frequency reference signal that may contain low frequency flutter and/or drift. The signal from the frequency multiplier 113 is supplied to a clock generator 122 that produces the substantially constant frequency two-phase clock signal $P_3$, $P_4$ and the transfer signal $T_2$ required by the time base correcting circuit 110. The clock generator, in response to the signal from the frequency multiplier, likewise produces the timing and gating signals for the multiplexer 124, the signal processing circuit 126, and the NTSC encoder 128, the functions of which have previously been described. In this way, the phase relationships between respective components of the composite video signal are preserved.

The invention has been described with respect to certain embodiments thereof, but it will be understood that variations and modifications can be made within the spirit and scope of the invention. For example, the preferred embodiment discloses a phase-locked-loop servo for controlling the capstan motor. The feedback signal to the servo was generated from the sync pulses in one channel. The tape drive system may also include a further feedback loop incorporating a tachometer feedback signal for enhanced stability in the transport of the tape.

It will also be apparent that deflutter buffers other than those described by Horak and Hayward in the referenced U.S. patent applications may be employed in apparatus according to the present invention. For example, each of the fluttering input signals may be clocked into one of several registers by a fluttering clock developed from the signal. The signal may be stored in that register for the appropriate period while a second or third register is being loaded and then the signal would be clocked out in correct sequence by a stable output clock. Thus each deflutter buffer would comprise three shift registers and means for shifting the input and output signals to and from the shift registers in proper sequence.

What is claimed is:

1. In apparatus for reproducing a sampled-analog type video signal recorded in a plurality of tracks on a magnetic recording medium, the signal portion in each track containing horizontal synchronization information, the apparatus including an essentially-fixed multi-channel playback head and means for moving the recording medium relative to the head at a controlled rate to reproduce the signal portion recorded in each track, and a plurality of channels for carrying the reproduced signal portions, a time base correcting circuit for reproducing the signal portions without substantial high frequency flutter and without substantial skew or scatter between the respective signal portions, said circuit comprising:
(a) means for producing a substantially constant frequency output clock signal;
(b) means responsive to the horizontal synchronization information in respective channels for producing a corresponding plurality of input clock signals, said input clock signals possessing flutter distortion corresponding to the flutter distortion present in the respective horizontal synchronization information;
(c) a plurality of deflutter buffers, one buffer per signal portion, each of said buffers including input shift register means for receiving a reproduced signal portion under control of the respective input clock signal, means for storing said signal portion for a period of time, and output shift register means for delivering said signal portion; and
(d) means for feeding said output clock signal to all of said output shift register means to cause said output shift register means to synchronously deliver the signal portions without substantial high frequency flutter and without substantial skew or scatter between the respective signal portions.

2. Video playback apparatus for reproducing a sampled-analog type video signal recorded on a plurality of parallel tracks on a magnetic recording medium, the signal portion recorded on each track containing horizontal sync information, said apparatus comprising:
(a) essentially-fixed head means for reproducing the respective signal portions recorded in the plurality of tracks;
(b) recording medium drive means for moving said recording medium relative to said head means, said drive means including a feedback servo loop for controlling the drive speed;
(c) means for generating a substantially constant frequency output clock signal;
(d) a time base correcting circuit for removing distortion from the reproduced signal portions, said circuit including a plurality of deflutter buffers, one buffer per signal portion, each of said deflutter buffers including input shift register means for receiving a signal portion, storage means for storing, up to a predetermined maximum amount of time, the signal portion thus received, and output shift register means for delivering said signal portion at a substantially constant rate;
(e) means for supplying said output clock signal to all of said output shift register means to cause said output shift register means to deliver the signal portions without substantial high frequency flutter and without substantial skew or scatter between respective signal portions;
(f) a plurality of clock generators, one generator associated with each deflutter buffer, each of said clock generators being responsive to said horizontal sync information in the respective signal portion for generating an input clock signal for feeding a video signal portion into the respective input shift register means; and
(g) means cooperative with said drive means and said time base correcting circuit for insuring that said signal portions remain in said time base correcting circuit no longer than said predetermined maximum amount of time.

3. Video playback apparatus for reproducing a sampled-analog type video signal recorded in a plurality of parallel tracks on a magnetic recording medium, the signal portion recorded on each track containing horizontal sync information, said apparatus comprising:
(a) essentially-fixed head means for reproducing the signal portions recorded on the plurality of tracks;
(b) means for producing a constant frequency reference signal;
(c) means responsive to the horizontal sync information in one of said signal portions for producing a feedback signal;
(d) recording medium drive means for moving said recording medium relative to said head, said drive means including a feedback servo loop responsive to said constant frequency reference signal and said feedback signal for removing relatively low frequency flutter and drift from the signal portions;
(e) means responsive to said constant frequency reference signal for producing a constant frequency output clock signal;
(f) means responsive to the horizontal sync information in said signal portions for producing a plurality of input clock signals;
(g) a plurality of deflutter buffers, one buffer per signal portion, for removing flutter from said signal portions, said deflutter buffers including input shift register means for receiving under control of the respective input clock signal, a fluttering signal portion, storage means for holding the signal portion for a period of time, and output shift register means for delivering said signal portion at a constant rate; and
(h) means for supplying said constant frequency output clock signal to all of said output shift register means to cause said output shift register means to deliver the signal portions without substantial flutter and without substantial skew or scatter between signal portions.

4. Video playback apparatus as claimed in claim 3, further comprising:
(a) signal processing means responsive to a plurality of timing signals for producing a composite color video signal from the sampled-analog type video signal; and
(b) means responsive to said constant frequency reference signal for producing said plurality of timing signals,
whereby phase stability is maintained in the composite color video signal.

5. Video playback apparatus as claimed in claim 4, wherein said one of said signal portions is reproduced from a centrally located track on said tape.

6. Video playback apparatus for reproducing a sampled-analog type video signal recorded on a plurality of parallel tracks on a magnetic medium, the signal portion recorded on each track containing horizontal sync information, said apparatus comprising:

(a) essentially-fixed head means for producing the respective signal portions recorded on the plurality of tracks;

(b) means for producing a fixed frequency reference signal;

(c) recording medium drive means for moving said recording medium relative to said head means, said drive means including a tachometer for generating a feedback signal and a feedback servo loop responsive to said fixed frequency reference signal and said feedback signal for moving said recording medium at a controlled rate;

(d) means responsive to the horizontal sync information in one of said signal portions for producing an output clock signal having low frequency flutter and/or drift corresponding to the low frequency flutter and/or drift present in said sync information;

(e) means responsive to the horizontal sync information in said signal portions for producing a corresponding plurality of input clock signals, said input clock signals possessing flutter distortion corresponding to the flutter distortion present in said respective horizontal sync information;

(f) a plurality of deflutter buffers, one buffer per signal portion, for removing relatively high frequency flutter from respective signal portions, each of said deflutter buffers including, input shift register means for receiving, under control of said respective input clock signal, said respective signal portion, storage means for holding said signal portion for a period of time, and an output shift register means for delivering said signal portion at a slowly fluttering and/or drifting rate; and (g) means for supplying said output clock signal to all of said output shift register means to cause said output shift register means to deliver the signal portions without substantial high frequency flutter and without substantial skew or scatter between signal portions.

7. Video playback apparatus as claimed in claim 6, comprising:

(a) signal processing means responsive to a plurality of timing signals for reproducing a composite color video signal from the sampled-analog type video signal; and (b) means responsive to the horizontal sync information in said one of said signal portions for producing said plurality of timing signals, whereby phase stability is maintained in the composite color video signal.

8. Video playback apparatus as claimed in claim 6, wherein said one of said signal portions is reproduced from a centrally located track on said tape.

9. In apparatus for reproducing a sampled-analog video signal recorded in a plurality of tracks on a magnetic recording medium, each of said tracks containing a signal portion representing successive groups of analog samples, said groups being separated by regularly occurring horizontal sync pulses, the apparatus including essentially-fixed, multichannel head means for reproducing the signal portions recorded in the plurality of tracks, means for moving the recording medium relative to the head means at a controlled rate, a time base correcting circuit for reproducing the signal portions without substantial high frequency flutter and without substantial scatter or skew between signal portions, comprising:

(a) means for generating a substantially constant frequency output clock signal;

(b) means responsive to the horizontal sync pulses in respective signal portions for producing an input clock signal for each signal portion, said input clock signals possessing flutter distortion corresponding to the flutter distortion present in the respective horizontal sync pulses;

(c) a deflutter buffer for each signal portion, each of said buffers including an input analog shift register responsive to said respective input clock signal for receiving, sample-by-sample, a group of samples, storage means for storing said group of samples for a period of time, and output analog shift register means for delivering said group of samples, sample-by-sample; and (d) means for supplying said substantially constant frequency output clock signal to all of said output analog shift register means to cause said output analog shift register means to deliver the signal portions without substantial high frequency flutter in the signal portions and without substantial skew or scatter between respective signal portions.

10. In apparatus for reproducing a sampled-analog type video signal recorded in a plurality of tracks on a magnetic recording medium, the signal portion in each track representing successive groups of analog samples and containing horizontal synchronization information, the apparatus including an essentially-fixed multichannel playback head and means for moving the recording medium relative to the head at a controlled rate to produce the signal portion recorded in each track and a plurality of channels for carrying the reproduced signal portions, a time base correcting circuit for reproducing the signal portions without substantial high frequency flutter and without substantial skew or scatter between the respective signal portions, said circuit comprising:

(a) means for producing a substantially constant frequency output clock signal;

(b) means responsive to the horizontal synchronization information in respective channels for producing a corresponding plurality of input clock signals, said input clock signals possessing flutter distortion corresponding to the flutter distortion present in the respective horizontal synchronization information;

(c) deflutter buffer means associated with the respective channels of said plurality of channels, each said deflutter buffer means being of a type adapted to accept a signal portion under control of a respective input clock signal and reproduce said signal portion under control of an output clock signal; and (d) means for feeding said substantially constant frequency output clock signal to all of said deflutter buffer means to cause said deflutter buffer means to synchronously deliver the signal portions without substantial high frequency flutter and without substantial skew or scatter between the respective signal portions.

* * * * *